US007370856B2

(12) United States Patent
Sawdon et al.

(10) Patent No.: US 7,370,856 B2
(45) Date of Patent: May 13, 2008

(54) ROTATING HEAD PIN CLAMP

(75) Inventors: Edwin G. Sawdon, St. Clair, MI (US); Michael D. Miller, Marysville, MI (US); Brian D. Petit, Algonac, MI (US)

(73) Assignee: BTM Corporation, Marysville, MI (US)

( * ) Notice: Subject to any disclaimer, the term of this patent is extended or adjusted under 35 U.S.C. 154(b) by 210 days.

(21) Appl. No.: 11/243,083

(22) Filed: Oct. 4, 2005

(65) Prior Publication Data

US 2007/0075472 A1 Apr. 5, 2007

(51) Int. Cl.
*B23Q 1/00* (2006.01)
*B23Q 3/08* (2006.01)
*B23Q 1/25* (2006.01)
*B23Q 1/22* (2006.01)

(52) U.S. Cl. .......................... 269/49; 269/54; 269/27; 269/31; 269/32; 269/74

(58) Field of Classification Search ................. 269/49, 269/32, 54, 27, 31, 74, 235; 92/2, 31-33
See application file for complete search history.

(56) References Cited

U.S. PATENT DOCUMENTS 3,948,502 A * 4/1976 Waller et al. ................ 269/27
4,799,657 A * 1/1989 Miller ........................ 269/24
5,118,088 A 6/1992 Sawdon
5,165,670 A 11/1992 Sawdon
5,171,001 A 12/1992 Sawdon
5,190,334 A 3/1993 Sawdon
5,853,211 A 12/1998 Sawdon et al.
5,871,250 A 2/1999 Sawdon
5,884,903 A 3/1999 Sawdon
6,378,855 B1 4/2002 Sawdon et al.
6,502,880 B1 1/2003 Sawdon
6,557,840 B2 5/2003 Sawdon
6,786,478 B2 * 9/2004 Pavlik et al. ................ 269/49
6,877,730 B2 4/2005 Sawdon et al.
6,902,159 B2 6/2005 Sawdon et al.
2003/0234478 A1 * 12/2003 Steele et al. ................. 269/25
2006/0049565 A1 * 3/2006 Petit et al. .................... 269/32

* cited by examiner

*Primary Examiner*—Joseph J. Hail, III
*Assistant Examiner*—Bryan R. Muller
(74) *Attorney, Agent, or Firm*—Harness, Dickey & Pierce, P.L.C.

(57) ABSTRACT

A clamp includes a body, a lead pin moveable relative to the body and an actuator supported by the body. The actuator is axially moveable between an extended position and a retracted position. The actuator includes a camshaft drivingly coupled to the lead pin. Axial movement of the camshaft causes the lead pin to rotate between a first positioned aligned with a first longitudinal axis and a second position aligned with a second longitudinal axis laterally offset from the first longitudinal axis.

24 Claims, 12 Drawing Sheets

ROTATING HEAD PIN CLAMP

BACKGROUND AND SUMMARY OF THE INVENTION

The present invention relates generally to a clamp and, more particularly, to a fluid powered, sealed pin locating and clamping apparatus.

Powered clamps have been commonly used to secure workpieces, such as sheet metal automotive body panels, polymeric parts and the like in checking fixtures, gauging stations, welding stations, punching stations and other locations within a manufacturing environment. Many existing clamps are powered by hydraulic or pneumatic fluid pressure. For example, reference should be made to the following U.S. patents, which have been invented by Sawdon: U.S. Pat. No. 6,502,880 entitled "Pin Part Locator" which issued on Jan. 7, 2003; U.S. Pat. No. 6,378,855 entitled "Locking Pin Clamp" which issued on Apr. 30, 2002; U.S. Pat. No. 5,190,330 entitled "Powered Clamp with Parallel Jaws" which issued on Mar. 2, 1993 and U.S. Pat. No. 6,902,159 entitled "Sealed Pin Locating and Clamping Apparatus" which issued on Jun. 7, 2005; all of which are incorporated by reference herein.

Many of the previously known locating pin clamps include a mechanism which drives a finger or arm which extends outwardly from the pin and pulls down against the workpiece to hold the workpiece in place while operations such as welding and/or clinching take place. Additionally, some locating pin clamps include an aperture in the locating pin to allow the finger to extend and retract from the pin during operation. This aperture provides a path for contamination to enter into the mechanism. Because locating pin clamps are often used in harsh environments, locating pin clamp reliability may be a concern.

Furthermore, some of the known locating pin clamps release the workpiece if there is a loss of fluid pressure during clamp operation. It is desirable to prevent the clamping arm from opening and releasing the workpiece if a loss of fluid pressure were to occur. Prior constructions employing such a feature are disclosed in U.S. Pat. No. 5,871,250 entitled "Sealed Straight Line Gripper" which issued to Sawdon on Feb. 16, 1999 and U.S. Pat. No. 5,853,211 entitled "Universal Gripper" which issued to Sawdon et al. on Dec. 29, 1998. These patents are also incorporated by reference herein.

In accordance with the present invention, a clamp includes a body, a lead pin moveable relative to the body and an actuator supported by the body. The actuator is axially moveable between an extended position and a retracted position. The actuator includes a camshaft drivingly coupled to the lead pin. Axial movement of the camshaft causes the lead pin to rotate between a first positioned aligned with a first longitudinal axis and a second position aligned with a second longitudinal axis laterally offset from the first longitudinal axis.

As another feature of the present invention, the clamp includes a body, an actuator moveably supported by the body, and a clamping member drivingly coupled to the actuator. The actuator includes a pair of rollers, each roller being positioned within one of two grooves formed on an axially and rotatably moveable camshaft. Each groove includes a plurality of detents. The clamping member axially translates and rotates between an extended position and retracted position in response to movement of the actuator. The rollers are positionable in engagement with the detents to restrict movement of the clamping member in the absence of force being provided by the actuator.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 6:
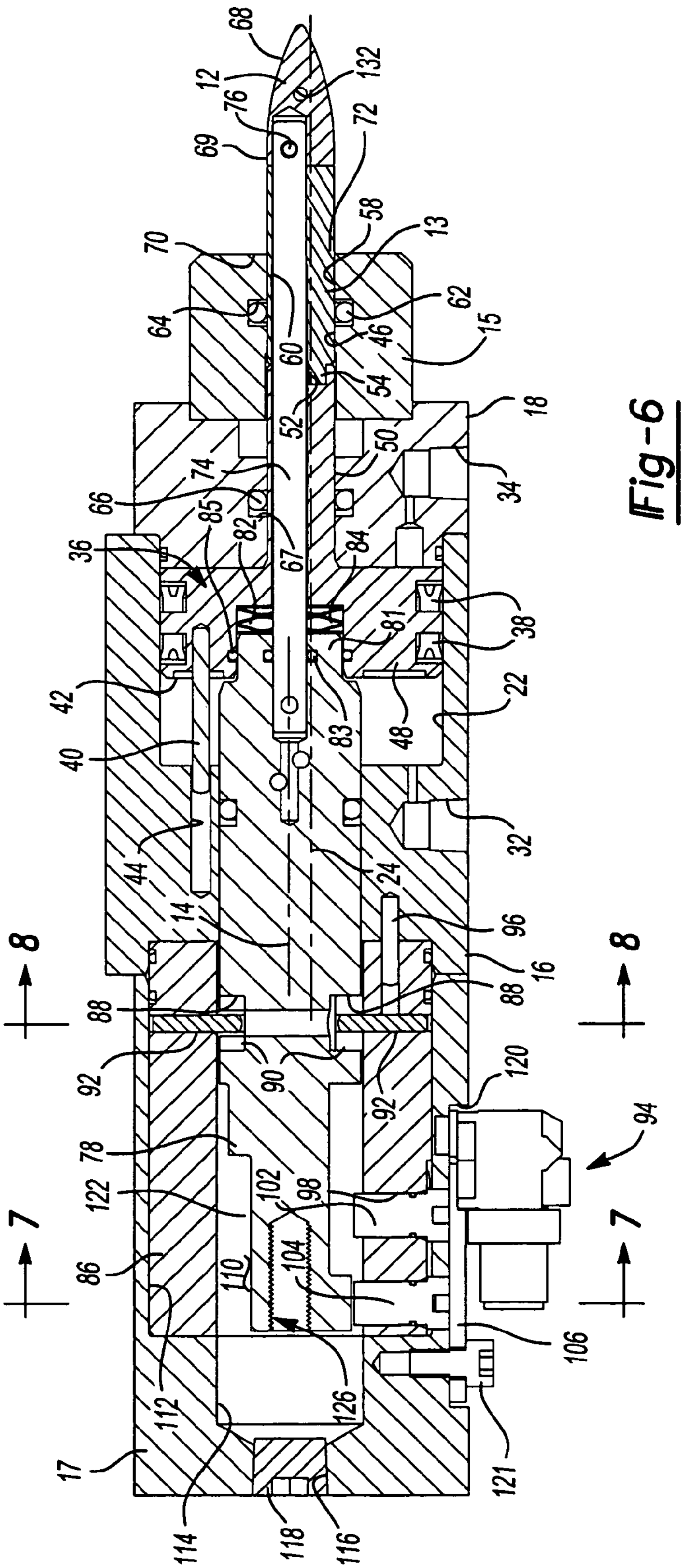
FIG. 6 is a cross-sectional view taken along line 6-6 as shown in FIG. 5.
Figure 7:
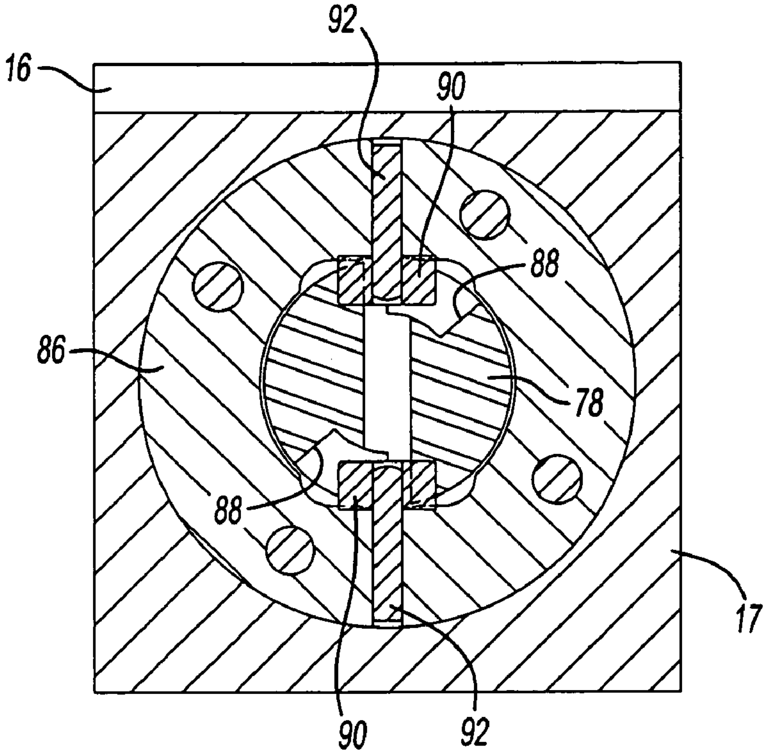
FIG. 7 is a cross-sectional view taken along line 7-7 as shown in FIG. 6.

Referring to FIGS. 1-8, a rotating head pin clamp 8 is used to locate or gauge and clamp a workpiece 10 in a workstation such as a moving assembly line, a manufacturing station or in an off-line workcell. Clamp 8 includes a two-piece pin assembly 11 having a rotatable lead pin or head 12 adjacent a lower pin 13. Head 12 is aligned with lower pin 13 when the pin assembly is in an extended position as shown in FIG. 6. At this position, both head 12 and lower pin 13 may pass through an aperture in workpiece 10. During a return stroke where pin assembly 11 moves from the extended position to a retracted position shown in FIG. 4, head 12 rotates about an eccentric axis 14 to partially overhang lower pin 13 and clamp workpiece 10 against a part rest 15. Clamp 8 also includes a body 16 sandwiched between a rear end cap 17 and a front end cap 18. Part rest 15 is coupled to front end cap 18. A cap seal 20 is positioned between body 16 and front end cap 18.

Clamp body 16 is substantially rectangularly-shaped having a machined NAAMS hole pattern on one or more sides. Body 16 includes a piston cavity 22 formed at the end nearest front end cap 18. Cavity 22 has a longitudinal axis 24. A camshaft bore 26 is in communication with piston cavity 22 and extends through the opposite end of body 16. Camshaft bore 26 extends along axis 14. Axis 14 is substantially parallel to and laterally offset from axis 24. Front end cap 18 is coupled to body 16 via a plurality of threaded fasteners 30.

Body 16 includes a port 32 in fluid communication with piston cavity 22. Front end cap 18 includes a port 34 also in fluid communication with piston cavity 22. A piston 36 is slidably positioned within piston cavity 22. A pair of seals 38 sealingly engage the sidewalls of piston cavity 22 so that piston 36 translates in reaction to pressurized fluid entering and/or exiting ports 32 and 34. A pin 40 is coupled to piston 36 and longitudinally extends from a rear face 42 of piston 36. Pin 40 is slidably positioned within a blind aperture 44 longitudinally extending through a portion of body 16. Pin 40 and aperture 44 function to restrict piston 36 from rotating during operation.

A bore 46 longitudinally extends through front end cap 18 along axis 24. Piston 36 includes a body portion 48 having an enlarged diameter slidably positioned within piston cavity 22 and a necked portion 50 having a reduced diameter at least partially extending through bore 46 of front end cap 18. The distal end of necked portion 50 includes a recess 52. Lower pin 13 extends through an aperture 58 in part rest 15. Lower pin 13 is operable to translate along axis 24. A dog 54 is formed on lower pin 13 and engages recess 52. The interconnection of dog 54 and recess 52 assures that lower pin 13 does not rotate relative to piston 36. An offset bore 60 longitudinally extends through lower pin 13 along axis 14. A seal 62 is positioned within a groove 64 formed within part rest 15 to sealingly engage an outer diameter of lower pin 13. Another seal 66 is positioned within a groove 67 formed in front end cap 18.

Lead pin or head 12 is positioned adjacent to lower pin 13. Lead pin 12 includes an outer surface having a tapered portion 68 and a cylindrical portion 69. Lead pin 12 includes a planar end face or clamping surface 70. Lead pin 12 is operable to rotate about axis 14 such that clamping surface 70 translates relative to an end surface 72 formed on lower pin 13. Lead pin 12 is rotatable through approximately 135 degrees about eccentric axis 14. In this manner, lead pin 12 may be positioned such that outer cylindrical portion 69 is aligned with the outer cylindrical surface of lower pin 13. Because lead pin 12 rotates about eccentric axis 14, the outer cylindrical portion 69 of lead pin 12 may be laterally offset from being in alignment with axis 24 and/or the outer surface of lower pin 13 such that clamping surface 70 overhangs lower pin 13 to engage a portion of workpiece 10.

A tie rod 74 is affixed to lead pin 12 via a roll pin 76. Tie rod 74 extends through lower pin 13 and piston 36 to mount to a camshaft 78. Tie rod 74 is coupled to camshaft 78 via a roll pin 80. A seal 83 engages tie rod 74 and camshaft 78.

Camshaft 78 is a substantially elongated cylindrical member rotatably positioned within bore 26. A seal 79 sealingly engages bore 26. Camshaft 78 includes a reduced diameter nose portion 81 moveably positioned within a pocket 82 formed in body portion 48 of piston 36. A spring 84 is positioned within pocket 82 to provide a separating force between piston 36 and camshaft 78. A seal 85 is positioned between nose portion 81 and piston 36.

A cam housing 86 is coupled to body 16 to rotatably support camshaft 78. A pair of cam slots 88 are formed on an external surface of camshaft 78. Cam rollers 90 are rotatably supported on pins 92 extending from cam housing 86. Because cam housing 86, pins 92 and rollers 90 are longitudinally fixed, axial movement of camshaft 78 causes it to rotate along axis 14 due to the shape of cam slots 88. Lead pin 12 axially translates and rotates between an extended position and retracted position in response to movement of camshaft 78. Furthermore, a plurality of detents 93 are formed near the end each cam slot 88. Cam rollers 90 are positionable in engagement with detents 93 to restrict movement of lead pin 12 in the absence of force being provided by piston 36. A loss of force may occur during an interruption of pressurized fluid supply. Cam rollers 90 are positioned within detents 93 when the lead pin 12 is in the retracted position. Accordingly, workpiece 10 will remain clamped against part rest 15 during a loss of pressurized fluid supply.

Cam housing 86 also includes provisions for mounting and aligning a proximity switch package 94. To assure that the features or provisions incorporated in cam housing 86 are properly aligned relative to body 16, a roll pin 96 interconnects cam housing 86 and body 16 at a specific angular orientation. Cam housing 86 includes a first sensor aperture 98 and a second sensor aperture 100 laterally extending therethrough. Sensor package 94 includes a first sensor head 102 positioned within first sensor aperture 98 and a second sensor head 104 positioned within second sensor aperture 100. First sensor head 102 and second sensor head 104 are mounted to a switch plate 106.

Rear end cap 17 includes a cylindrical bore 110 extending therethrough. A first portion 112 of the cylindrical bore is in receipt of cam housing 86. A reduced diameter portion 114 is in receipt of a portion of camshaft 78. A threaded portion of a bore 116 is in receipt of a plug 118. A plurality of fasteners 119 extend through rear end cap 17 and cam housing 86 to threadingly engage body 16. Rear end cap 17 includes a laterally extending aperture 120 substantially aligned with the sensor apertures 98 and 100 extending through cam housing 86. First sensor head 102 and second sensor head 104 extend through aperture 120 as well as apertures 98 and 100, respectively. Switch plate 106 is mounted to rear end cap 17 via a fastener 121. Switch plate 106 sealingly closes aperture 120 and supports sensor heads 102 and 104. Sensor heads 102 and 104 are longitudinally spaced apart from one another and are operable to detect if a portion of camshaft 78 is within close proximity to one of the sensor heads.

Figure 1:
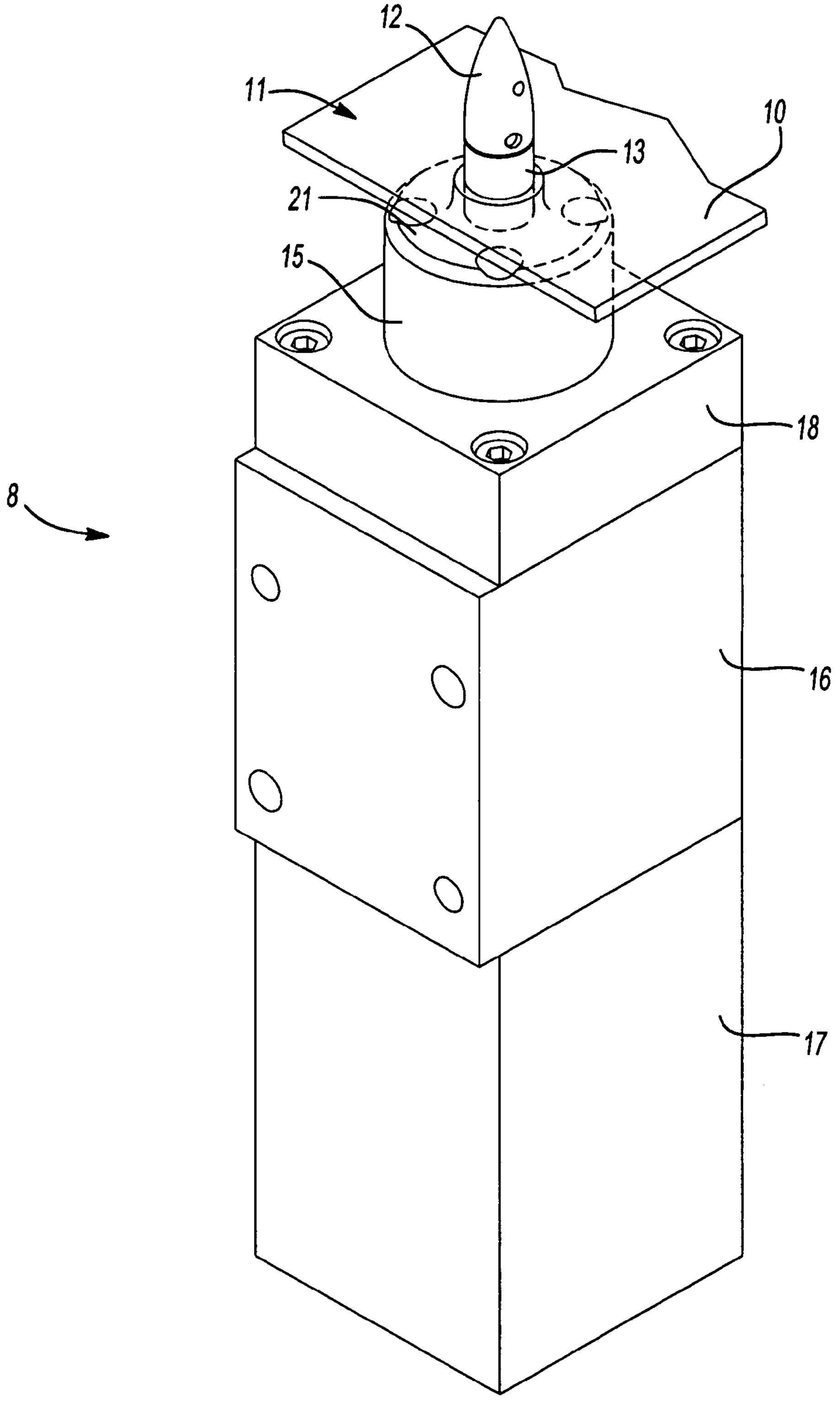
FIG. 1 is a perspective view of an exemplary embodiment pin clamp constructed in accordance with the teachings of the present invention.
Figure 2:
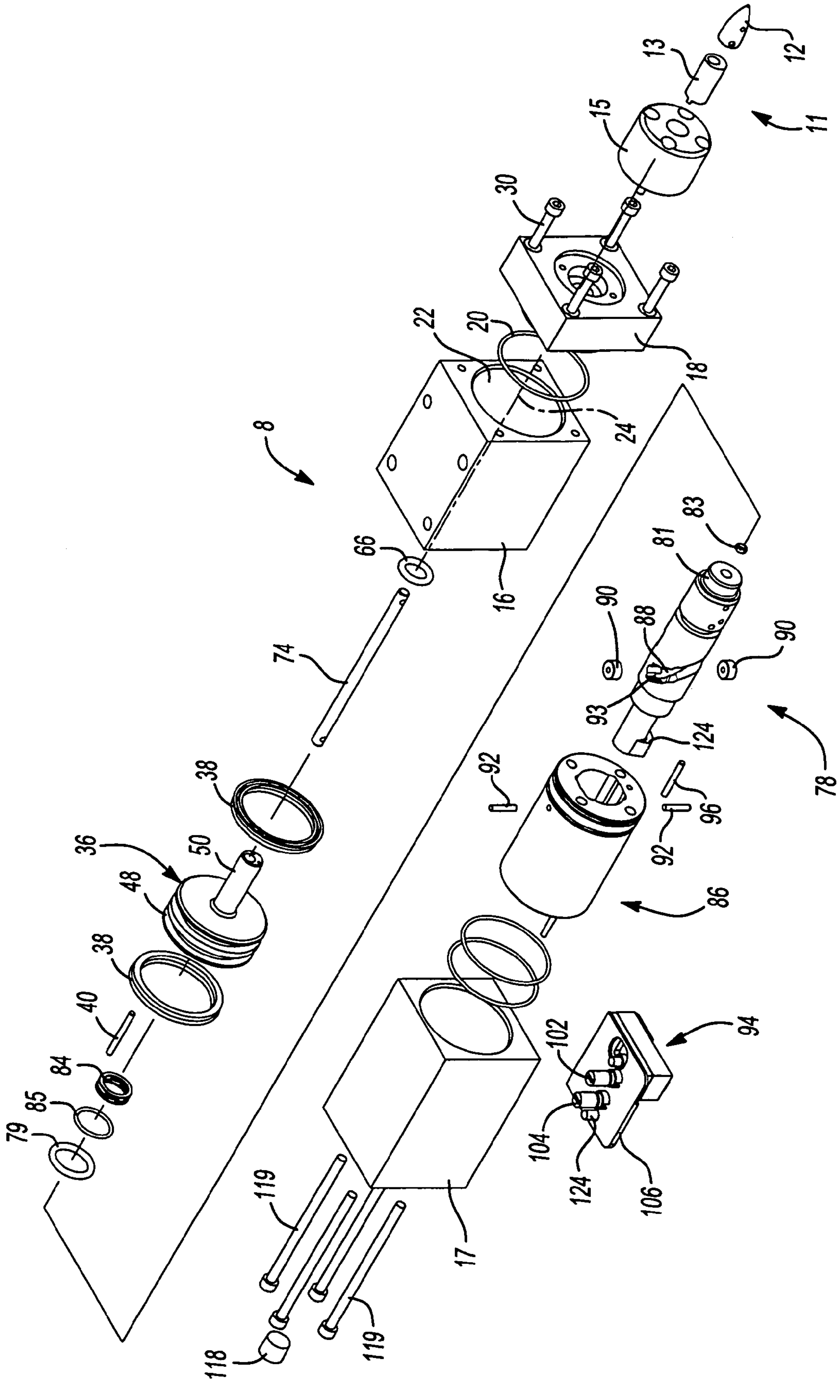
FIG. 2 is an exploded perspective view of the pin clamp depicted in FIG. 1.
Figure 3:
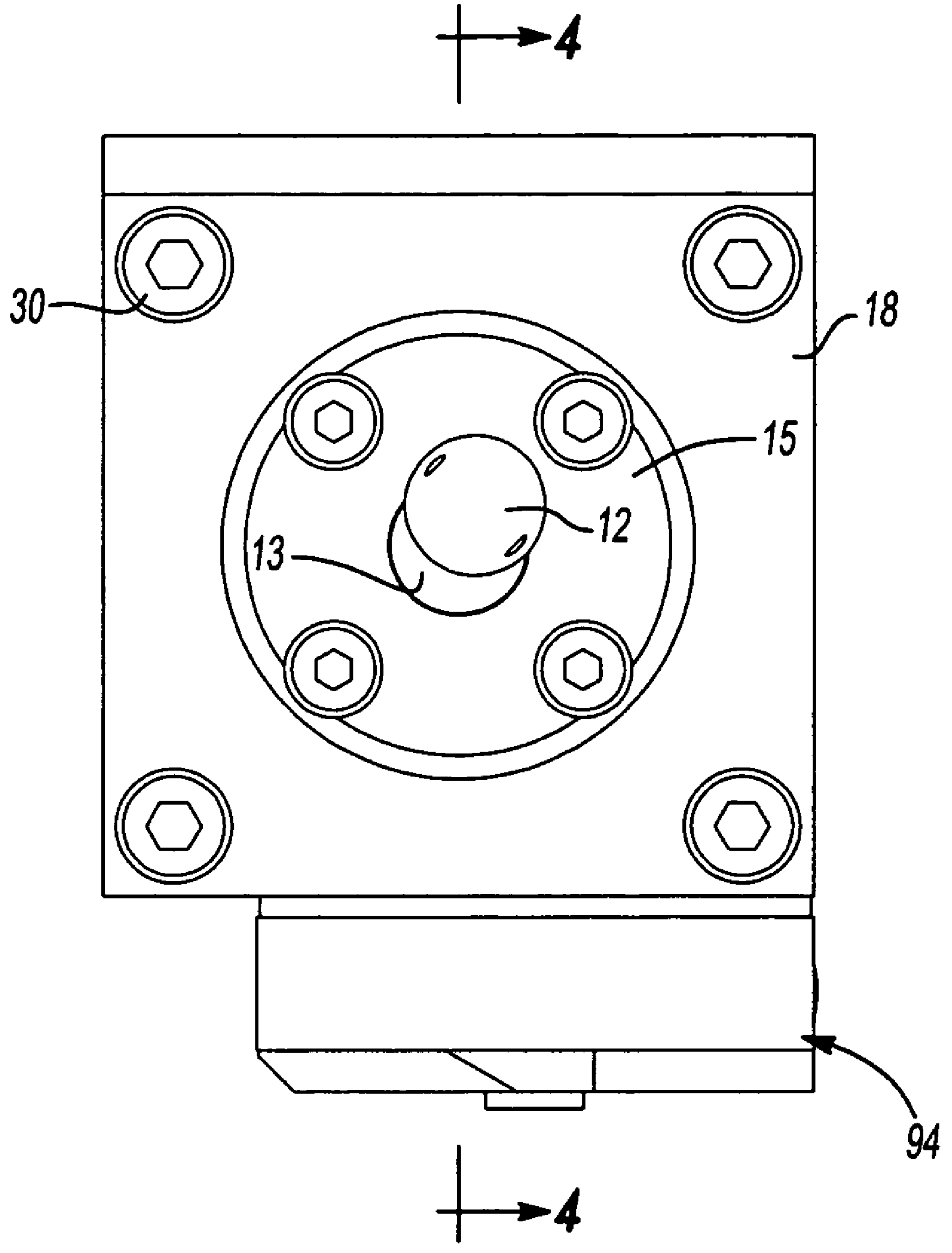
FIG. 3 is a top view of the pin clamp showing the lead pin in a retracted and offset position.
Figure 4:
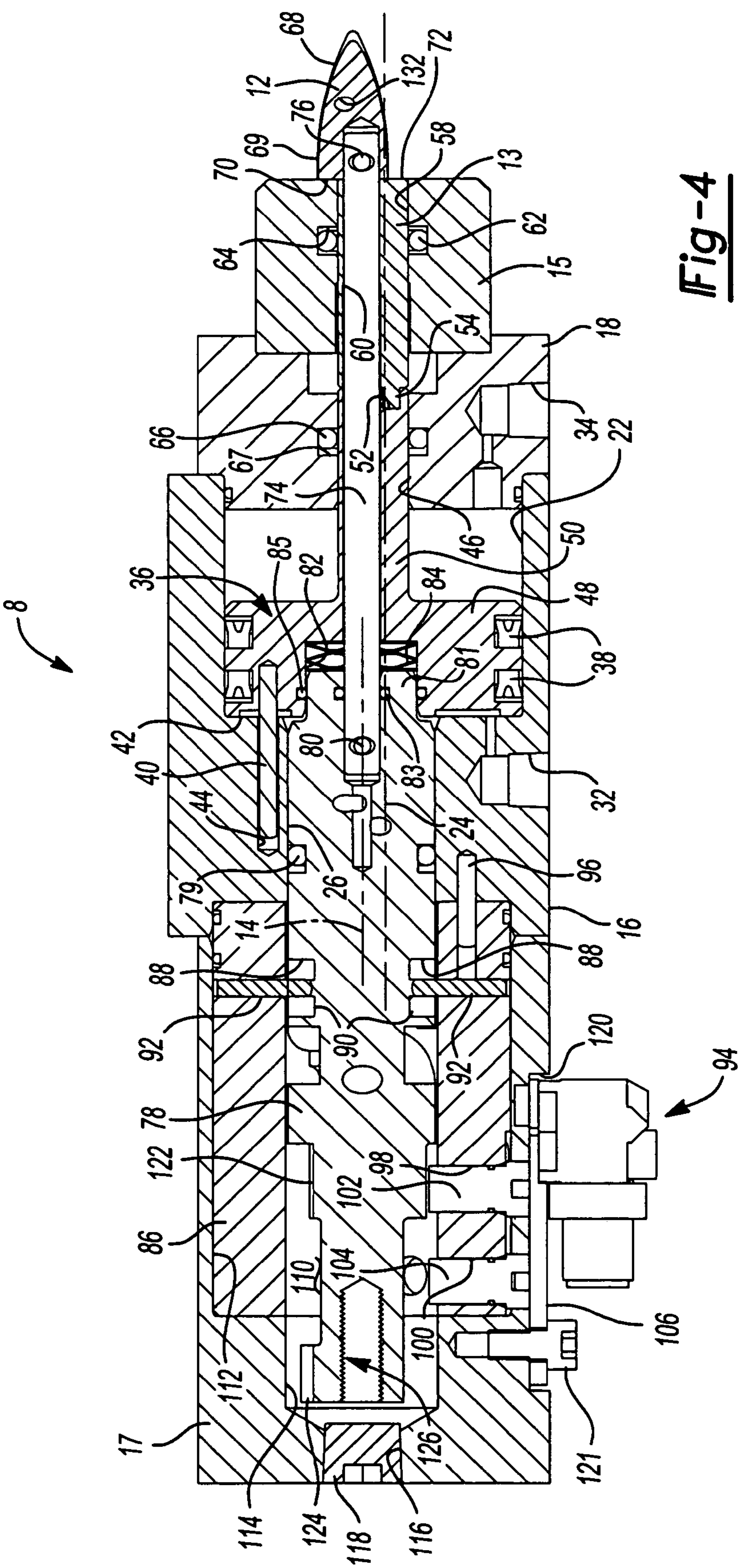
FIG. 4 is a cross-sectional view taken along line 4-4 as shown in FIG. 3.
Figure 5:
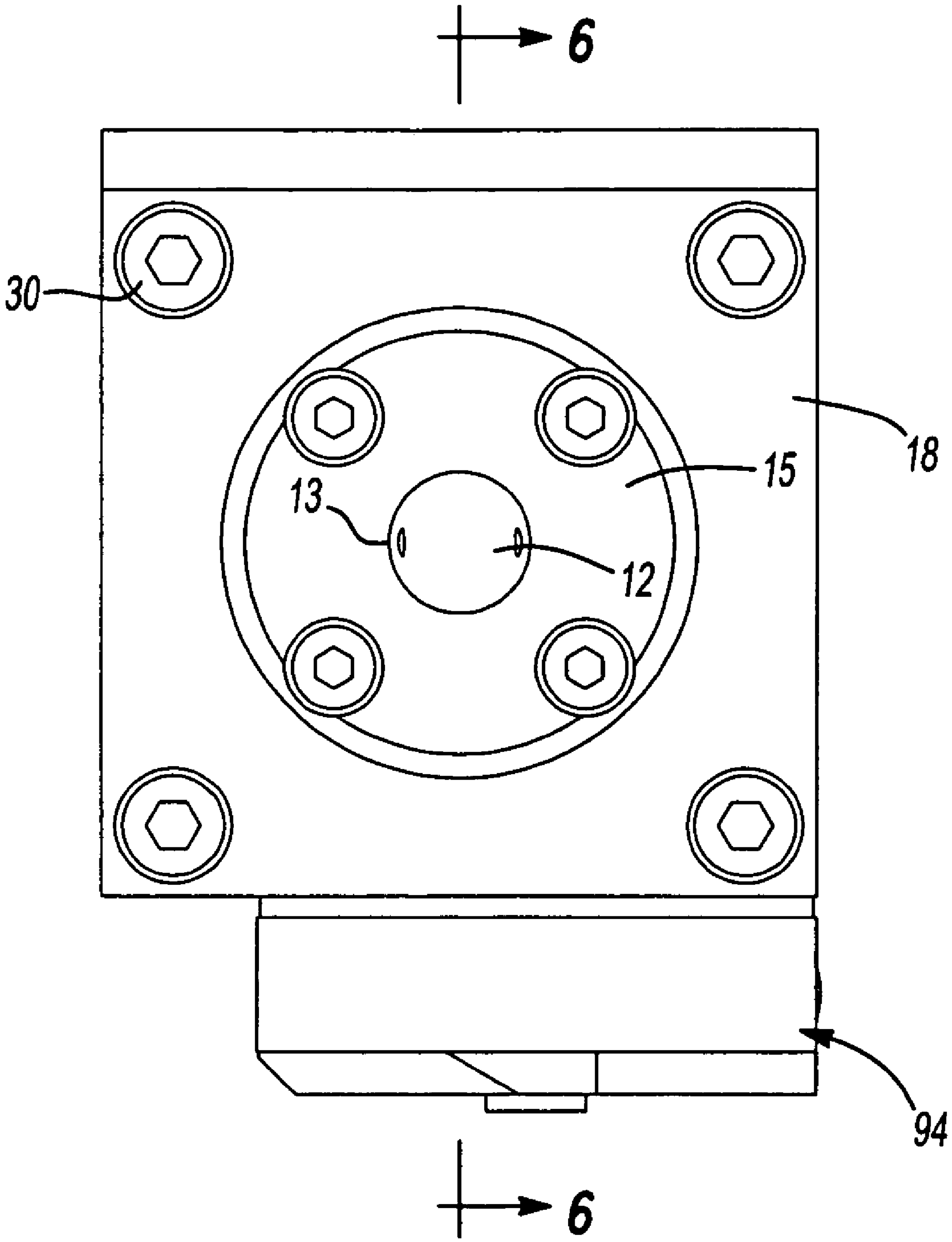
FIG. 5 is a top view of the pin clamp showing the lead pin in an extended position aligned with a lower pin.

To assist a user in determining the axial and rotational position of lead pin or head 12, camshaft 78 includes a first lobe 122 and a second lobe 124. First lobe 122 is shaped and longitudinally positioned to cause sensor head 102 to output a signal indicative of the presence of lobe 122 when piston 36 is in the fully retracted position and lead pin 12 is in its retracted and eccentrically offset position as shown in FIG. 4. Lobe 124 radially extends from camshaft 78 at a longitudinal position such that lobe 124 is positioned proximate sensor head 104 when piston 36 is in the fully advanced position (FIG. 6) and lead pin 12 is in an extended position substantially aligned with lower pin 13 along axis 24. A signal indicating that lead pin 12 is in the extended, aligned position is output at this time.

Figure 8:
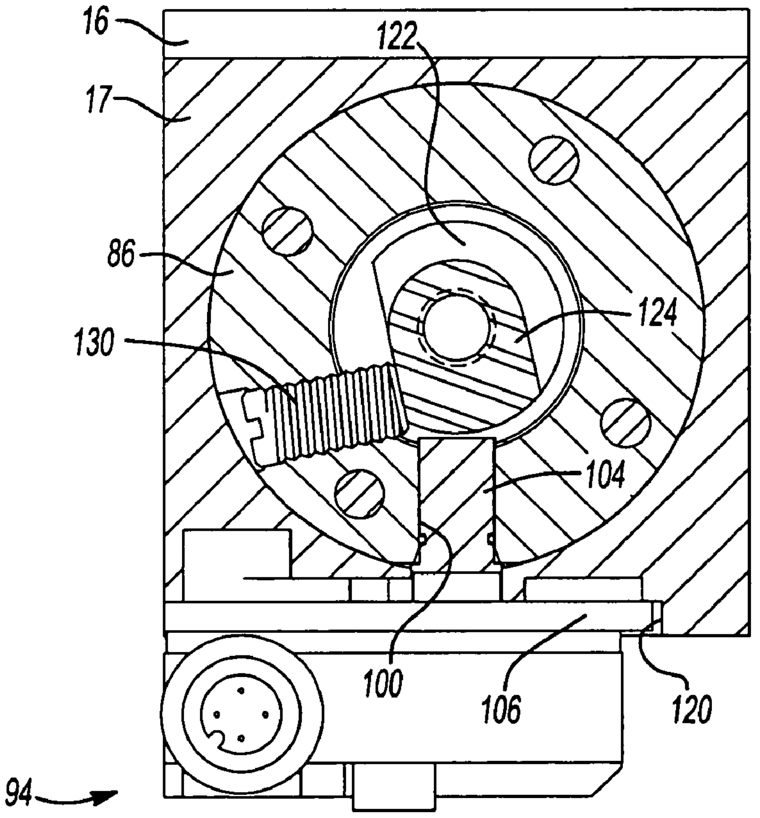
FIG. 8 is a cross-sectional view taken along line 8-8 as shown in FIG. 6.

Camshaft 78 includes an internally threaded blind aperture 126 substantially aligned with internally threaded portion 116 of bore 110. By removing plug 118 from rear end cap 17, access to internally threaded blind aperture 126 is provided. A hand tool (not shown) may be inserted through bore 116 and threadingly engaged with camshaft 78 through threaded aperture 126. Manual rotation of camshaft 78 allows a user to manually operate the actuator mechanism. During manual or powered operation it may be desirable to fine tune the position of lead pin 12 relative to axis 24 at the fully extended position of piston 36. In this manner, an end user may assure that cylindrical portion 69 of lead pin 12 is aligned with the outer surface or lower pin 13 at a particular point in operation. An adjustable stop 130 is threadingly engaged with cam housing 86 as shown in FIG. 8. Adjustable stop 130 inwardly extends into cylindrical bore 110 proximate second sensor head 104. Adjustable stop 130 operates to restrict rotational movement of camshaft 78 at the extended position. By rotating adjustable stop 130, the rotational position of camshaft 78 and lead pin 12 may be adjusted.

As best shown in FIGS. 4 and 6, lead pin 12 includes a bore 132 transversely extending therethrough. Bore 132 is sized to receive a tool (not shown) operable to manually rotate lead pin 12 should lead pin 12 become locked or otherwise jammed against a workpiece. Once lead pin 12 has been rotated to clear the workpiece, the tool is removed from bore 132. At this point, normal operation is resumed.

It should be appreciated that lead pin 12, lower pin 13 and part rest 15 define a pin assembly of a certain size. Specifically, outer cylindrical portion 69 of lead pin 12 is sized to protrude through a like sized aperture in a workpiece. However, different workpieces may have differently sized apertures. Accordingly, a family of pin assemblies may exist to allow a user to easily modify pin clamp 8 for use in clamping workpieces having differently sized apertures. It is contemplated that lead pin 12 has an outer diameter of 12 mm while the members of the family of pin assemblies may have pin sizes ranging from 6 mm to 40 plus mm in diameter. The ranges previously described are merely exemplary and it should be appreciated that the pin clamp may be constructed to have lead pins of various sizes.

Figure 9:
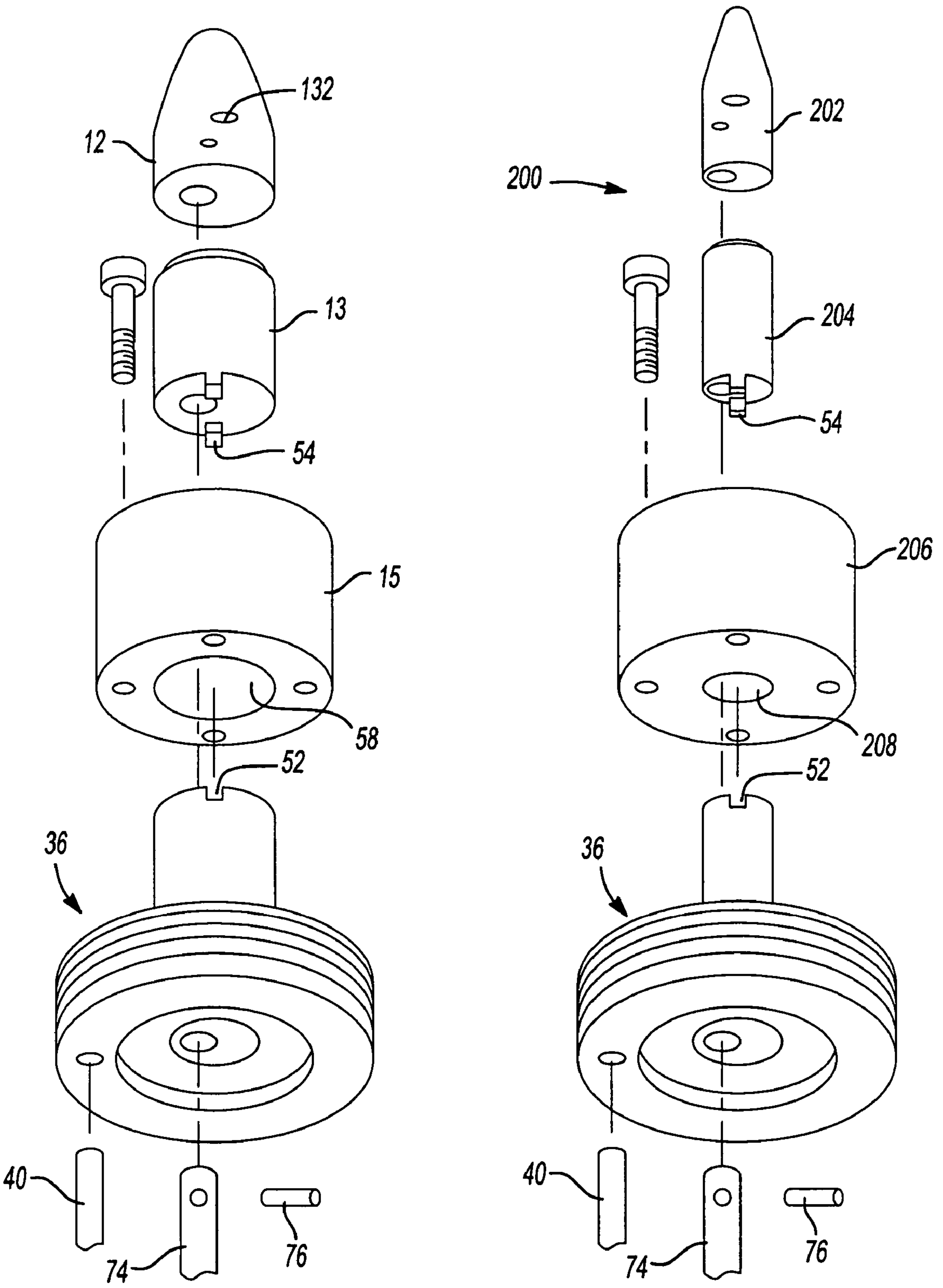
FIG. 9 is an exploded perspective view of an alternate embodiment pin assembly.

FIG. 9 depicts an alternate embodiment pin assembly 200 having a lead pin 202, a lower pin 204 and a part rest 206. Lead pin 202 and lower pin 204 have outer diameters substantially smaller than the outer diameter of lead pin 12 and lower pin 13. Accordingly, an aperture 208 extending through part rest 206 is smaller than aperture 58 to properly guide lower pin 204 during operation of the pin clamp. Alternate embodiment pin assembly 200 works in conjunction with the remaining components of pin clamp 8. Specifically, lead pin 202 is drivingly coupled to tie rod 74 via a roll pin as previously described. Other pin assemblies (not shown) having various pin outer diameters may be constructed for use with other workpieces as desired.

Figure 10:
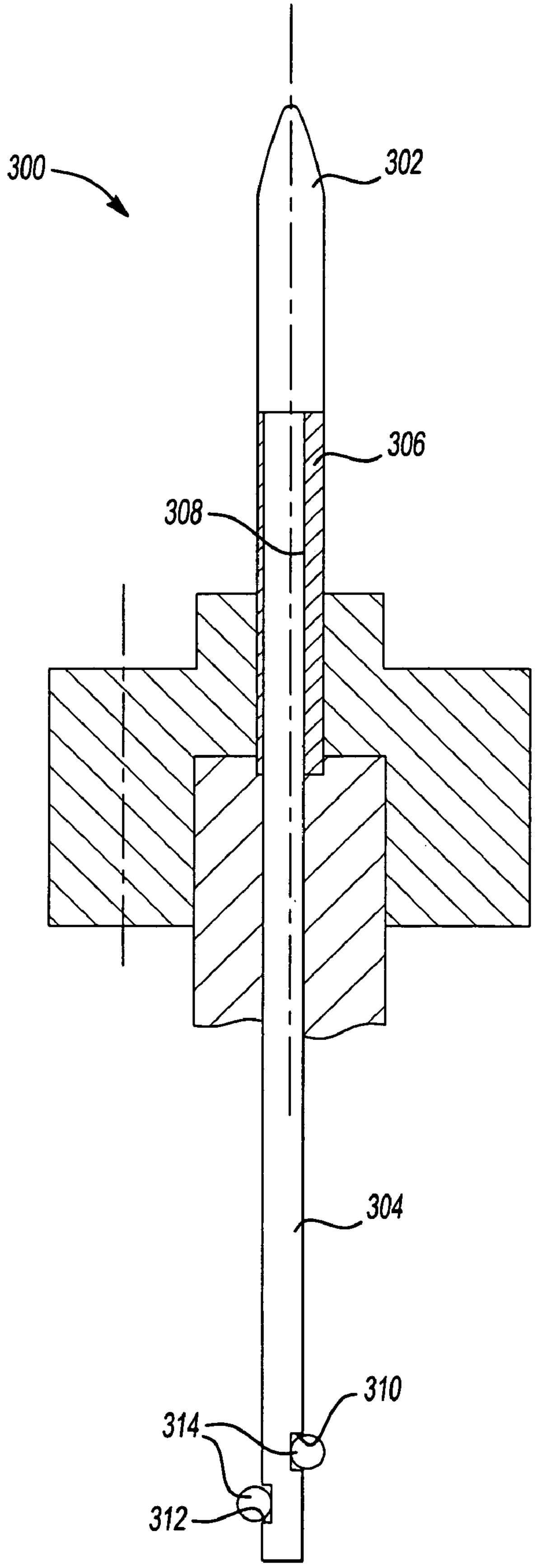
FIG. 10 is a cross-sectional view of another alternate embodiment pin assembly.

FIG. 10 depicts another alternate embodiment pin assembly 300. Pin assembly 300 includes components for replacement of lead pin 12, lower pin 13, part rest 15 and tie rod 74. The outer diameter of lead pin 302 is 6 mm. Because the outer diameter is relatively small, sufficient material does not exist to allow tie rod 74 to interconnect with the lead pin via roll pin. Accordingly, lead pin 302 includes an integral tie rod portion 304. A lower pin 306 having an outer diameter of 6 mm includes a throughbore 308 sized to rotatably accept tie rod portion 304. Tie rod portion 304 includes a first groove 310 and a second groove 312 sized and positioned to accept roll pin 314 to drivingly interconnect tie rod portion 304 with camshaft 78.

Figure 11:
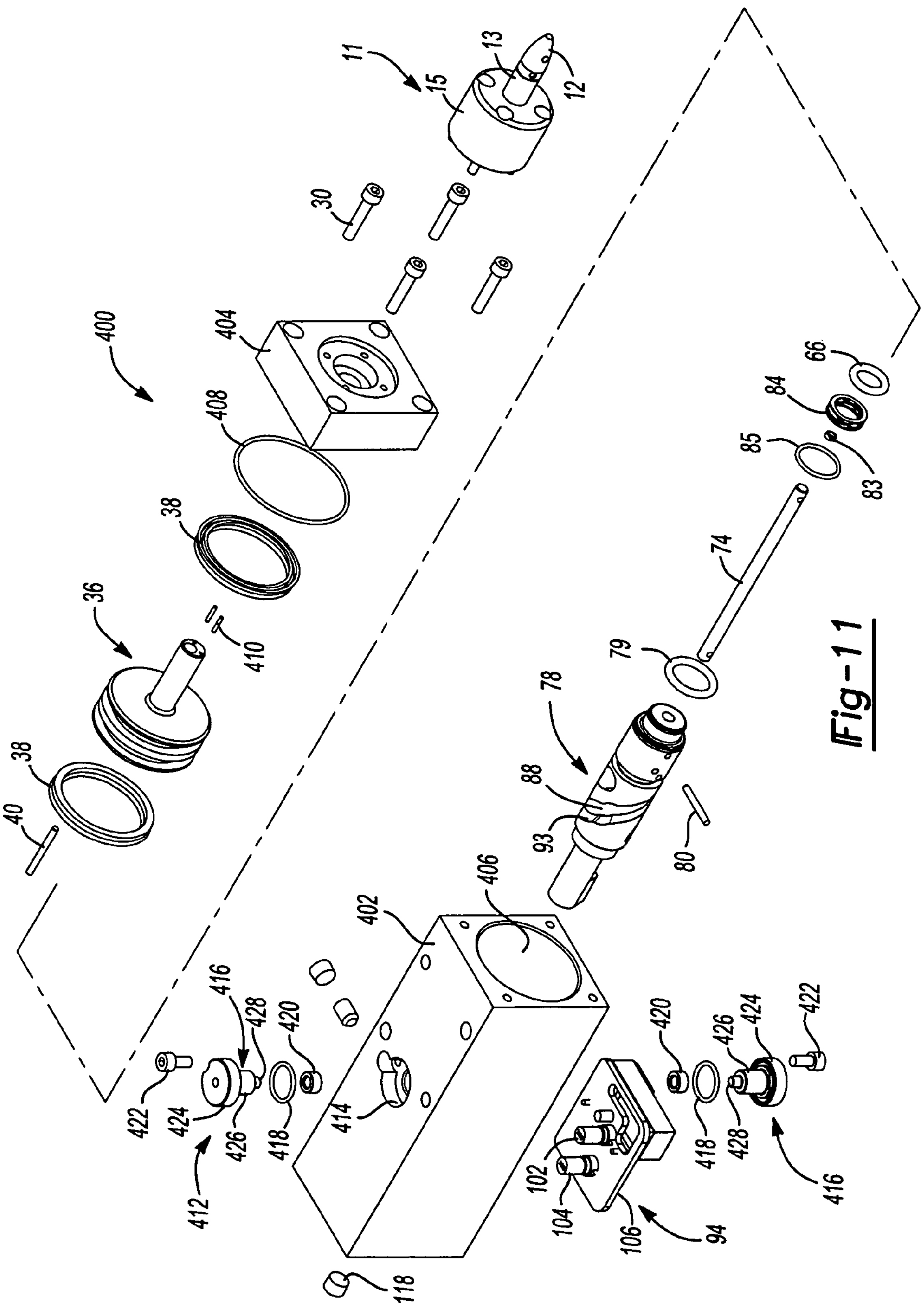
FIG. 11 is an exploded perspective view of an alternate embodiment pin clamp.
Figure 12:
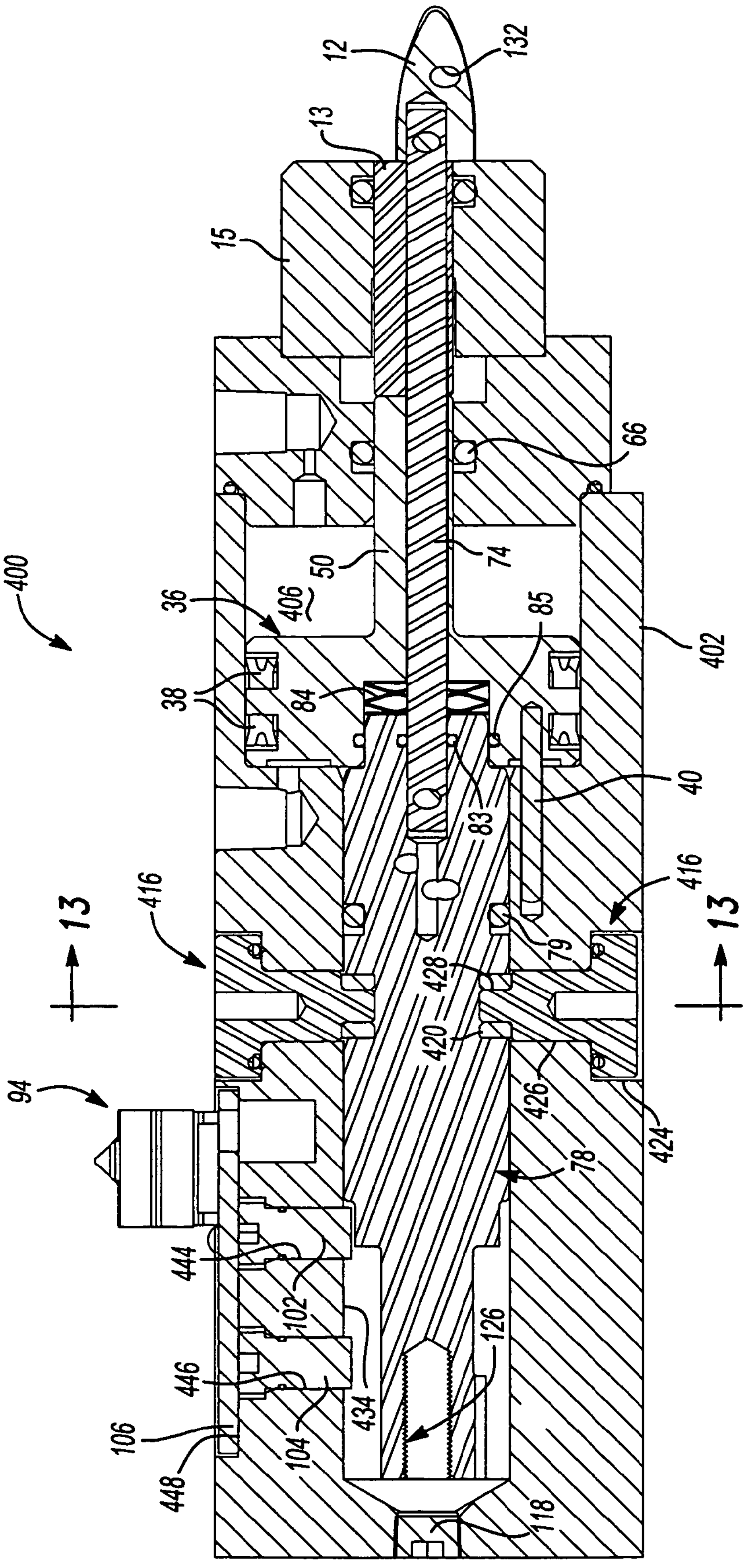
FIG. 12 is a cross-sectional view of the pin clamp shown in FIG. 11.
Figure 13:
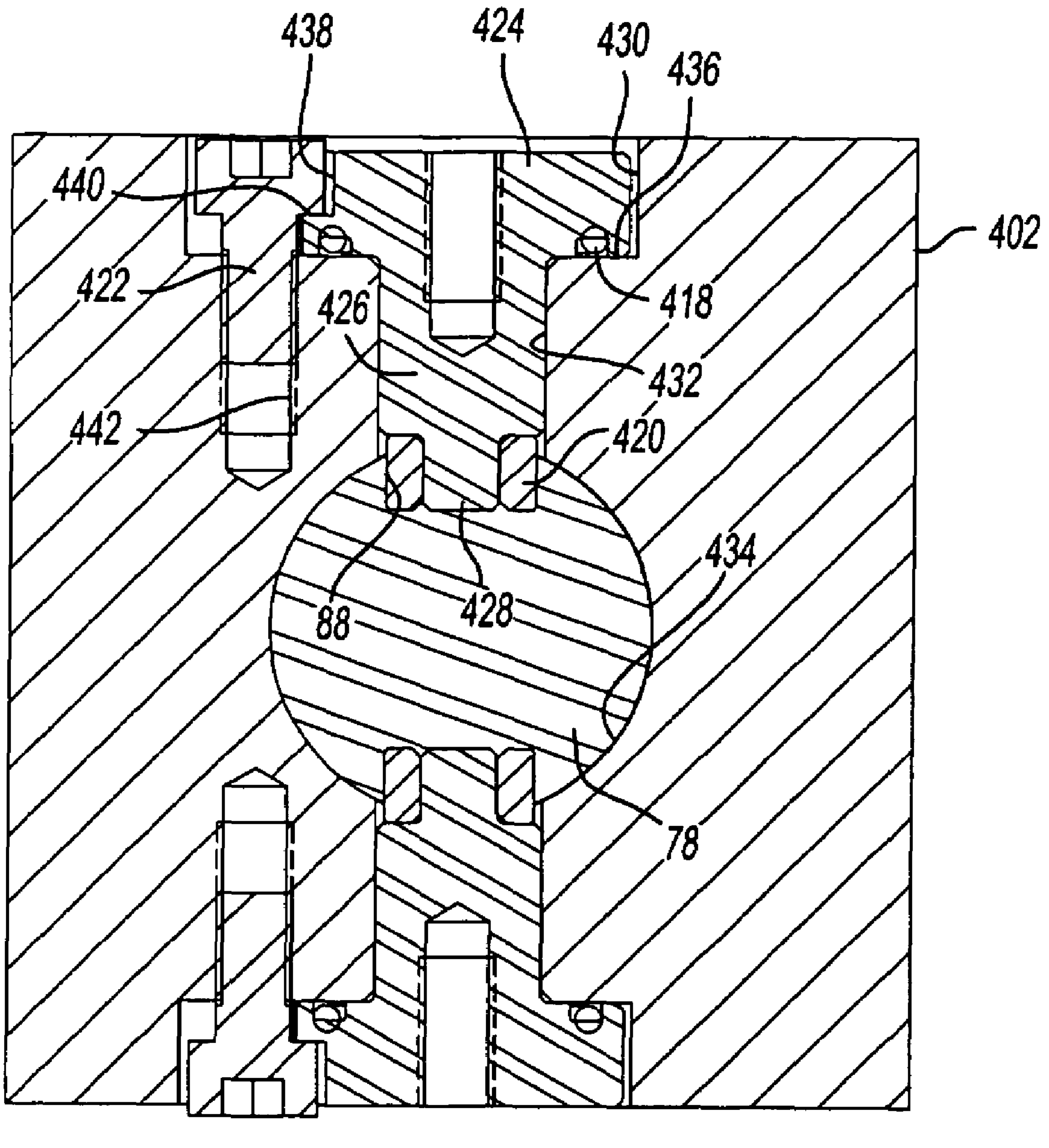
FIG. 13 is a cross-sectional view taken along line 13-13 shown in FIG. 12.

FIGS. 11-13 depict an alternate embodiment rotating head pin clamp 400. Pin clamp 400 is substantially similar to pin clamp 8 and incorporates some of the components previously described. Specifically, pin clamp 400 utilizes two-piece pin assembly 11, head 12, lower pin 13, part rest 15, piston 36, tie rod 74, camshaft 78 and proximity switch package 94 of pin clamp 8. Other elements such as certain seals and fasteners are common to pin clamp 8 and pin clamp 400. Common elements will retain the reference numerals previously introduced. Furthermore, pin clamp 400 functions substantially similar to pin clamp 8. As such, a detailed description of the function of pin clamp 400 will not be provided.

Clamp 400 includes a one-piece body 402 slidably housing camshaft 78 and piston 36. Housing 402 performs the functions previously performed by rear end cap 17, cam housing 86 and body 16 of clamp 8. A front end cap 404 encloses a bore 406 formed in body 402. Front end cap 404 is substantially similar to front end cap 18 except that front end cap 404 is sealed to body 402 using a face seal 408. Front end cap 404 is coupled to body 402 via fasteners 30. Pin clamp 400 utilizes piston 36 having a slight modification from its use within pin clamp 8. Specifically, a pair of roll pins 410 interconnect necked portion 50 with lower pin 13 to assure that piston 36 does not rotate relative to lower pin 13. Alternatively, the recess and dog interconnection previously described may be used with pin clamp 400.

Roller assemblies 412 extend through counterbores 414 formed in body 402 to engage cam slots 88 on camshaft 78. Each roller assembly 412 includes a stanchion 416, a seal 418, a roller 420 and a retaining screw 422. Stanchion 416 includes a head portion 424, a guide portion 426 and a spindle portion 428.

As best shown in FIG. 13, counterbore 414 includes an enlarged diameter portion 430 and a reduced diameter portion 432 in communication with a cavity 434 formed in body 402. Head portion 424 is positioned within enlarged diameter portion 430. Seal 418 is positioned in engagement with a stepped surface 436 within counterbore 414. Guide portion 426 is positioned with reduced diameter portion 432. Spindle portion 428 partially protrudes into cavity 434 and rotatably supports roller 420. Each roller 420 is positioned within a cam slot 88. Head portion 424 includes a recess 438 defining a land 440. Retaining screw 422 threadingly engages a threaded aperture 442 formed in body 402. Retaining screw 422 clamps against land 440 to clamp roller assembly 412 to body 402.

Body 402 includes a first sensor bore 444 in receipt of first sensor head 102 and a second sensor bore 446 in receipt of second sensor head 104. A pocket 448 accepts switch plate 106. Sensor package 94 functions as previously described in relation to pin clamp 8.

One skilled in the art should appreciate that pin clamp 400 may also be configured to utilize the alternate embodiment pin assemblies 200 and/or 300 if so desired by a user.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A clamp comprising:

a body;

a lead pin axially and rotatably moveable relative to the body; and an actuator supported by the body, the actuator being axially moveable between an extended position and a retracted position as well as including a camshaft drivingly coupled to the lead pin, wherein axial movement of the camshaft causes the lead pin to rotate between a first position aligned with a first longitudinal axis and a second position aligned with a second longitudinal axis laterally offset from the first longitudinal axis, wherein the camshaft is operable to rotate about the second longitudinal axis.

2. The clamp of claim 1 further including a lower pin axially moveable along the first longitudinal axis, the lead pin being positioned adjacent to the lower pin, wherein the lead pin and the lower pin are coaxially aligned when the lead pin is in the first position, a portion of the lead pin overhanging the lower pin when the lead pin is in the second position.

3. The clamp of claim 2 wherein the lead pin is further spaced apart from the body when located at the first position than when at the second position.

4. The clamp of claim 3 wherein the actuator includes a piston slidably positioned within the body, the piston being moveable along the first longitudinal axis.

5. The clamp of claim 1 wherein the camshaft includes a pair of grooves in receipt of rollers.

6. The clamp of claim 5 wherein the rollers are rotatably supported by pins mounted to the body, the grooves being shaped such that axial translation of the camshaft causes it to rotate as well.

7. The clamp of claim 1 wherein the actuator includes a piston moveable along the first longitudinal axis, the camshaft being axially moveable and rotatable about the second longitudinal axis.

8. The clamp of claim 1 further including a proximity switch assembly coupled to the body, the proximity switch assembly being operable to determine if the lead pin is in the first position or the second position.

9. The clamp of claim 8 wherein the proximity switch assembly includes two axially spaced apart sensor heads, each sensor head being operable to output a signal when a portion of the camshaft is positioned proximate one of the sensor heads.

10. The clamp of claim 8 wherein the proximity switch assembly is operable to determine if the lead pin is in one of two predetermined rotational positions as well as one of two predetermined axial positions.

11. A clamp comprising:

a body;

an actuator moveably supported by the body;

a pair of rollers, each roller being positioned within one of two grooves formed on an axially and rotatably moveable camshaft, each groove including a plurality of detents; and a clamping member drivingly coupled to the actuator, wherein the clamping member axially translates and rotates between an extended position and retracted position in response to movement of the actuator, the rollers being positionable in engagement with the detents to restrict movement of the clamping member in the absence of force being provided by the actuator, wherein the actuator includes a piston slidably positioned within a cavity formed in the body, the cavity defining a first longitudinal axis, the camshaft being axially moveable and rotatable about a second longitudinal axis substantially parallel and offset from the first longitudinal axis.

12. The clamp of claim 11 wherein the piston is drivingly coupled to the camshaft, the detents maintaining the position of the clamping member when pressurized fluid is not acting on the piston.

13. The clamp of claim 11 wherein the detents are formed near the end of each groove, the rollers being positioned within the detents when the clamping member is in the retracted position.

14. The clamp of claim 11 further including a lower pin protruding from an aperture formed in a body, the substantially cylindrical portion of the clamping member being coaxially aligned with the lower pin when the clamping member is in the extended position.

15. The clamp of claim 14 wherein the clamping member is not coaxially aligned with the lower pin when the clamping member is in the retracted position.

16. The clamp of claim 11 wherein a substantially planar end face of a cylindrical portion of the clamping member is adapted to engage and apply a clamping force to a workpiece.

17. The clamp of claim 11 wherein the clamping member is not positioned within a slot of another member.

18. The clamp of claim 11 further including an adjustable stop selectively engageable with the camshaft, the adjustable stop being positionable to vary a lateral position of the clamping member at the extended position.

19. The clamp of claim 11 further including a proximity switch assembly coupled to the body, the proximity switch assembly being operable to determine if the clamping member is in the extended position or the retracted position.

20. A method of operating a clamp, comprising:

providing a clamp having a body with an actuator moveably supported by the body, the actuator having a camshaft in driving engagement with rollers, the actuator being drivingly coupled to a pin having a body and a head;

linearly translating the actuator;

engaging the rollers with slots formed in the camshaft to rotate the camshaft about an axis offset and parallel to a longitudinal axis of the pin as it translates; and rotating the head of the pin along an axis offset from the longitudinal axis of the pin to cause the head of the pin to partially overhang the pin body during clamping.

21. The method of claim 20 wherein the actuator further includes an axially translating piston that is positioned within a cavity formed in the body and is drivingly coupled to the camshaft.

22. The method of claim 21 further including translating the piston along the longitudinal axis of the pin.

23. The method of claim 20 further including positioning the rollers within detents formed in the slots to maintain the position of the head when the actuator is not powered.

24. The method of claim 20 further including adjusting a stop to limit the position of the camshaft when the head is in an extended position to align an outer surface of the head with an outer surface of the pin body.

* * * * *

UNITED STATES PATENT AND TRADEMARK OFFICE

CERTIFICATE OF CORRECTION

PATENT NO. : 7,370,856 B2
APPLICATION NO. : 11/243083
DATED : May 13, 2008

INVENTOR(S) : Edwin G. Sawdon, Michael D. Miller and Brian D. Petit

It is certified that error appears in the above-identified patent and that said Letters Patent is hereby corrected as shown below:

Column 1, line 20, “U.S. Pat. No. 5,190,330” should be --U.S. Pat. No. 5,190,334--.

Column 1, line 54, “positioned” should be --position--.

Column 4, line 2, after “end”, insert --of--.

Column 8, line 6, Claim 14, “a body” should be --the body--.

Column 8, line 6, Claim 14, “the substantially” should be --a substantially--.

Signed and Sealed this

Thirtieth Day of December, 2008

JON W. DUDAS

*Director of the United States Patent and Trademark Office*